(12) United States Patent
Edelen et al.

(10) Patent No.: US 10,504,029 B2
(45) Date of Patent: Dec. 10, 2019

(54) PERSONALIZED PREDICTIVE MODELS

(71) Applicant: Microsoft Technology Licensing, LLC., Redmond, WA (US)

(72) Inventors: James Edelen, Renton, WA (US); Jian Li, New Malden (GB); John Fitzgerald Bronskill, Cambridge (GB); John P. Guiver, Saffron Walden (GB); Kashif Dastgir, Snoqualmine, WA (US); Saravanakumar Rajmohan, Redmond, WA (US); Artyom Sadovsky, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 767 days.

(21) Appl. No.: 14/755,253

(22) Filed: Jun. 30, 2015

(65) Prior Publication Data

US 2017/0004408 A1  Jan. 5, 2017

(51) Int. Cl.
*G06N 7/02* (2006.01)
*G06N 20/00* (2019.01)
*G06N 5/02* (2006.01)
*G06Q 10/10* (2012.01)
(Continued)

(52) U.S. Cl.
CPC ............ *G06N 7/005* (2013.01); *G06N 5/02* (2013.01); *G06N 20/00* (2019.01); *G06Q 10/107* (2013.01); *G06Q 30/02* (2013.01)

(58) Field of Classification Search
CPC ............ G06N 5/02; G06N 7/00; G06N 20/00
See application file for complete search history.

(56) References Cited

U.S. PATENT DOCUMENTS 5,845,048 A   12/1998  Masumoto
6,901,398 B1   5/2005  Horvitz et al.
(Continued)

FOREIGN PATENT DOCUMENTS

CN   101060421 A   10/2007
CN   101467449 A   6/2009
(Continued)

OTHER PUBLICATIONS

Shani, et al., "Evaluating Recommendation Systems", In Technical Report MSR-TR-2009-159, Nov. 2009, 41 pages.
(Continued)

*Primary Examiner* — Eric Nilsson

(57) ABSTRACT

Generating and utilizing personalized predictive models are provided. When an electronic input is received, a generic predictive model is used to predict a user response to the input. After a prescribed period of time, an analysis is performed to determine the user's actual response to the input, as well as, the user's actual responses to other inputs of the same type. Training is performed on the generic predictive model to generate a new and personalized predictive model based on the user's actual responses to the analyzed inputs. The personalized predictive model is then utilized for predicting user response to future inputs of the same type. At a prescribed frequency, the generated personalized predictive model is updated by analyzing actual user responses to predictions provided by the personalized predictive model.

18 Claims, 9 Drawing Sheets

US 10,504,029 B2

Page 2

(51) Int. Cl.
*G06Q 30/02* (2012.01)
*G06N 7/00* (2006.01)

(56) References Cited

U.S. PATENT DOCUMENTS

| | | | |
|---|---|---|---|
| 7,089,238 B1* | 8/2006 | Davis | G06F 17/3071 707/737 |
| 8,249,231 B2 | 8/2012 | Chakraborty et al. | |
| 9,558,452 B2 | 1/2017 | Guiver et al. | |
| 2006/0080161 A1 | 4/2006 | Arnett et al. | |
| 2006/0085248 A1 | 4/2006 | Arnett et al. | |
| 2006/0247915 A1 | 11/2006 | Bradford et al. | |
| 2007/0043866 A1 | 2/2007 | Garbow et al. | |
| 2007/0239637 A1 | 10/2007 | Paek et al. | |
| 2008/0146334 A1 | 6/2008 | Kil | |
| 2012/0072781 A1 | 3/2012 | Kini et al. | |
| 2012/0143798 A1 | 6/2012 | Sundelin et al. | |
| 2012/0143806 A1 | 6/2012 | Sundelin et al. | |
| 2012/0269436 A1 | 10/2012 | Mensink et al. | |
| 2012/0290662 A1 | 11/2012 | Weber et al. | |
| 2013/0080362 A1 | 3/2013 | Chang et al. | |
| 2013/0132331 A1 | 5/2013 | Kowalczyk et al. | |
| 2013/0144818 A1 | 6/2013 | Jebara et al. | |
| 2013/0159220 A1 | 6/2013 | Winn et al. | |
| 2013/0159408 A1* | 6/2013 | Winn | G06Q 10/10 709/204 |
| 2015/0134304 A1 | 5/2015 | Guiver et al. | |
| 2015/0142717 A1 | 5/2015 | Guiver et al. | |
| 2015/0324699 A1 | 11/2015 | Jebara et al. | |

FOREIGN PATENT DOCUMENTS

| | | |
|---|---|---|
| CN | 102812486 A | 12/2012 |
| WO | 2005086059 A1 | 9/2005 |
| WO | 2015069607 A2 | 5/2015 |

OTHER PUBLICATIONS

Fisher, et al., "Multi-Objective Optimisation for Information Access Tasks Draft Submitted to CIKM 2003", Retrieved on: Dec. 23, 2013, Available at : http://citeseerx.ist.psu.edu/viewdoc/download?doi=10.1.1.14.4327&rep=rep1&type=pdf.
Savenkov, et al., "Search Engine Switching Detection Based on User Personal Preferences and Behavior Patterns", In Proceedings of 36th International ACM SIGIR Conference on Research and Development in Information Retrieval, Jul. 28, 2013, 10 pages.
Estrada, Francisco J., "Segmentation Results and Quantitative Evaluation", In Thesis of Doctor of Philosophy, Jun. 2005, 31 pages.
Schroedl, et al., "Personalized Ad Placement in Web Search", In Proceedings of 4th International Workshop on Data Mining and Audience Intelligence for Advertising, Jul. 25, 2010, 9 pages.
Roth, et al., "Suggesting (More) Friends Using the Implicit Social Graph", In Proceedings of 28th International Conference on Machine Learning, Jun. 28, 2011, 11 pages.
Xiang, et al., "Modeling Relationship Strength in Online Social Networks", In Proceedings of 19th International Conference on World Wide Web, Apr. 26, 2010, 8 pages.
"International Search Report and Written Opinion Issued in PCT Application No. PCT/US2016/039686", dated Aug. 31, 2016, 11 Pages.
Ayodele et al., "Machine Learning Email Prediction System (MLEPS)", In International Journal for Infonomics, vol. 3, Issue 4, Dec. 2010, 5 pages.
Cubranic et al., "Automatic Bug Triage Using Text Categorization", In Proceedings of the Sixteenth International Conference on Software Engineering & Knowledge Engineering, Jun. 20, 2004, 6 pages.
Dredze et al., "Intelligent Email: Reply and Attachment Prediction", In Proceedings of the 13th International Conference on Intelligent User Interfaces, Jan. 13, 2008, 4 pages.
International Search Report and Written Opinion Issued in PCT Patent Application No. PCT/US2014/063770, dated Apr. 29, 2015, 10 Pages.
U.S. Office Action from U.S. Appl. No. 14/076,106 dated Jul. 29, 2016.
U.S. Notice of Allowance from U.S. Appl. No. 14/076,106 dated Nov. 4, 2016.
"International Preliminary Report on Patentability Issued in PCT Application No. PCT/US2016/039686", dated Aug. 23, 2017, 6 Pages.
"Second Written Opinion issued in PCT Application No. PCT/US2016/039686", dated May 30, 2017, 5 Pages.
"Oral Proceedings Issued in European Patent Application No. 14802279.1", dated Apr. 12, 2019, 8 Pages.
"Office Action Issued in European Application No. 14802279.1", dated Jul. 23, 2018, 7 Pages.
"Search Report Issued in European Patent Application No. 14802279.1", dated Jun. 1, 2017, 9 Pages.
"Office Action Issued in Chinese Patent Application No. 201480060604.3", dated Nov. 27, 2017, 20 Pages.
"Second Office Action Issued in Chinese Patent Application No. 201480060604.3", dated Jun. 15, 2018, 22 Pages.
Bashar, et al., "Application of Bayesian Networks for Autonomic Network Management", In Journal of Network and Systems Management, vol. 22, Issue 2, Apr. 2014, 35 Pages.
Xiang, Liang, "Recommendation system practice", In Publication of Posts & Telecom Press, Jun. 2012, 16 Pages with English Translation.
Xing, Xing, "Study of the method for social network personalized recommendation", Information Technology Journal of the Chinese doctoral dissertation, Jun. 2013, 17 Pages with English Translation.

* cited by examiner

PERSONALIZED PREDICTIVE MODELS

BACKGROUND

Computer and software users have grown accustomed to user-friendly software applications that help them write, calculate, organize, prepare presentations, send and receive electronic mail, search Internet-based information, make music, and the like. In many instances of software usage, it is desirable to predict an outcome, for example, a user action in response to a received input. For example, it may be desirable to predict whether a user will read an email having various features, whether a user may review or otherwise respond to a received electronic advertisement, whether a user may respond to a given electronic search result, whether a user may select a given traffic route, utilize a received electronic coupon, watch a suggested video, or the like. While generic predictive modeling systems may be used to predict user response to various inputs, such systems typically do not provide accurate results because individual user responses to different inputs can vary greatly.

SUMMARY OF THE INVENTION

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Aspects of systems and methods for generating and utilizing personalized predictive models are disclosed. According to various aspects, when an electronic input is received, a generic predictive model is used to predict a user response to the input. After a prescribed period of time, for example, seven days, an analysis is performed to determine the user's actual response to the input, as well as, the user's actual responses to other inputs of the same type. Training is performed on the generic predictive model to generate a new and personalized predictive model based on the user's actual responses to the analyzed inputs. The personalized predictive model is then utilized for predicting user response to future inputs of the same type. At a prescribed frequency, the generated personalized predictive model is updated by analyzing actual user responses to predictions provided by the personalized predictive model. According to one aspect, generating, training, and updating the personalized predictive model may include computing a precision and recall curve for each user for assisting in a determination of user response thresholds.

The details of one or more aspects are set forth in the accompanying drawings and description below. Other features and advantages will be apparent from a reading of the following detailed description and a review of the associated drawings.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout several views.

DETAILED DESCRIPTION

Figure 1:
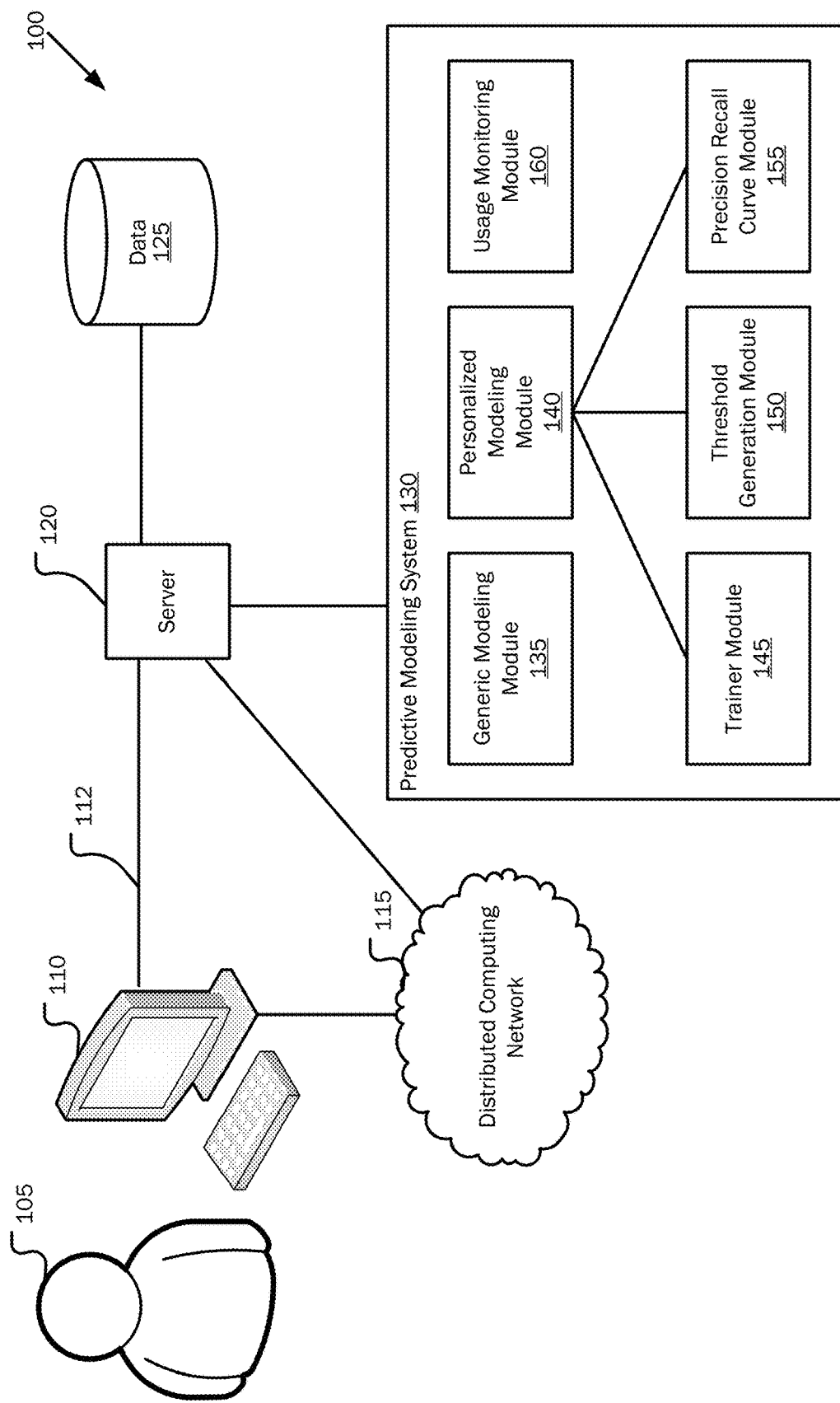
FIG. 1 is a block diagram illustrating a system for generating and utilizing personalized predictive models.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is non-limiting, and instead, the proper scope is defined by the appended claims. Examples may take the form of a hardware implementation, or an entirely software implementation, or an implementation combining software and hardware aspects. The following detailed description is, therefore, not to be taken in a limiting sense.

For purposes of illustration and understanding, aspects disclosed herein are discussed with reference to an electronic mail system with which a user may send and receive a variety of electronic communications to and from one or more other users. As will be appreciated from the disclosure set out herein, aspects of the present disclosure are equally useful with respect to other electronic inputs. For example, aspects of the present disclosure may similarly be used with respect to any system in which a user may respond to an electronic input for which a user response prediction would be useful. For example, aspects of the present disclosure may be useful in determining whether a user may review or otherwise respond to a received electronic advertisement, whether a user may respond to a given electronic search result, whether a user may select a given traffic route, utilize a received electronic coupon, watch a suggested video, or the like.

According to aspects, generation of a personalized predictive model allows use of a user behavior as an input and predicts what the user will do in the future with one or more related future inputs. For example, if a user reads an email message from a given sender, a prediction may be made that the user will read future emails from the same sender. Inputs to the model may include any number of parameters or features of a given electronic item (e.g., an email message) such as sender, carbon copy (cc) identifications, subject line content, dates/times of transmission, and the like. These inputs are introduced to the model, and the model may then predict what the user will do with a next email message based on what the model has learned about the user's behavior in the past.

A very broad model may be generated that will apply to all users in a system. That is, a single broad predictive model may be generated to predict the actions of all email users in a corporation, education system, geographic area, or the like including a very simple rule that if a message comes from a sender that is not in the user's contact list, then predict the user will not read it. Such a model would be very inaccurate, but it is an example of a predictive model that is very broad and could be applied to almost all users. Rather than defining a single global model with a single rule that applies to all users, a model may be generated for a particular user based on that user's specific behavior in the past. But, potentially millions of different models would be required for each user in the service or system.

To solve the above and other problems, according to aspects of the present disclosure, a personalized predictive model is generated on a per user basis by defining decision thresholds for each user. As will be described in detail below with reference to FIG. 3, the decision threshold for each user includes a percentage number between zero and 100 based on past user behavior. That percentage number may be used for predicting future user behavior with respect to future inputs. For example, the model might predict for a given user a 70 percent probability that the user will take a certain action with respect to a particular input. However, because the example initial 70 percent threshold determination may not produce desired results where, for example, 85 percent of received emails are read while only 70 percent were predicted to be read.

According to aspects of the present disclosure, in order to improve on the decision threshold, for a given user, the decision threshold is reviewed on a regular basis against accumulated data for actual user decisions compared with predicted decisions based on the in-use decision threshold. As needed, the in-use decision threshold is updated for improving prediction accuracy. As described in detail below, precision/recall curves are developed for each user and are updated from time-to-time, for example, daily based on accumulated prediction data versus actual decision data, and updated decision thresholds are then determined from the updated precision/recall curves. The personalized predictive model for a given user is then updated with a corresponding updated decision threshold so that the personalized predictive model is continually being updated to reflect variations in user behavior.

Referring now to the drawings, FIG. 1 is a block diagram illustrating a system 100 for generating and utilizing personalized predictive models. A user 105 is illustrated in association with a computer 110 with which the user may operate a variety of software applications for which the services of the predictive modeling system 130 as disclosed herein may be used.

As illustrated in FIG. 1, the computer 110 may communicate with a server 120 via a direct beta link 112 or via a distributed computing network 115 such as the Internet or a corporate or other entity intranet. The server 120 is illustrative of any remote computer system or collection of computer systems at which the predictive modeling system 130 described below may be operated for providing personalized predictive modeling for the user 105 via his/her computer 110. As should be appreciated, the server 120 may be illustrative of one or more computing systems operating as a backend services system for a company, educational system or other entity, or the server 120 may be illustrative of one or more computers or collections of computers operating in a cloud-based data center at which the predictive modeling system 130 is operated for users 105.

The data repository 125 is illustrative of a general purpose data storage unit or system for storing electronic information sent by, received by, accessed by, or otherwise communicated to or from the user 105 in association with the predictive modeling system 130, described below. Received inputs, for example, electronic mail items and one or more features associated therewith, may be stored at the data repository 125, and predictive modeling information, including user response predictions made by the generic modeling module or the personalized predictive modeling module, as well as, data generated for updating a personalized predictive model may be stored at the use data repository 125.

According to aspects, the predictive modeling system 130 is a system, device or collection of modules operating on a system or device operative to generate and update a personalized predictive model for the user 105 for predicting user actions with respect to one or more received inputs. As used herein, the term "module" represents an individual computing device having processing, memory and other computer operating components described below with reference to FIGS. 6-8 on which is hard coded operating instructions or with which is processed a set of computer-executable instructions for causing the module to perform the functions described for it herein. Alternatively, the term "module" represents a set of instructions executed by a computing device or system (FIGS. 6-8) for causing the module to perform the functions described for it herein. Each module described below may operate independently but communicatively with other modules or each module may be integrated as a single operating module or system (e.g., the predictive modeling system 130, described herein).

As will be described in further detail below with reference to FIGS. 4 and 5, the generic modeling module 135 is illustrative of a general purpose generic modeling module that may be used for predicting outcomes of any of a large number of users in response to a given input. For example, with respect to a prediction as to whether a given electronic mail item may be read by any user, an example of a generic model might predict that any email received by any user from a sending party that is not listed in the receiving user's contacts list will not be opened by the receiving user. Such a generic model may be applied to any example email items received by any example user as opposed to being personalized to any particular user.

The personalized modeling module 140 is illustrative of a software module, system or device operative to generate a personalized predictive model, as described herein, for predicting actions of a particular user with respect to a given input. The trainer module 145 is a software module, system or device operative to analyze actual user decisions/responses based on/to actual inputs in comparison to predicted user decisions/responses and is further operative to update user decision thresholds for updating the operation of a personalized predictive model generated for the user. The threshold generation module 150 is illustrative of a software application, system or device operative to generate an optimum threshold with which predicted user responses may be predicted. The precision/recall curve module 155 is illustrative of a software module, system or device operative to generate a precision/recall curve for each user at various decision threshold levels for determining an optimum decision threshold for use with the updated personalized predictive model.

The usage monitoring module 160 is illustrative of a software module, system or device operative to monitor user responses to receive inputs for providing user responses data to the personalized modeling module 140 and associated components 145, 150, 155 for generating and updating a personalized predictive model, as disclosed herein.

The computer 110, the server 120, the data repository 125 and the components of the predictive modeling system 130 are illustrative of a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

According to aspects, the components of the predictive modeling system 130 are illustrated and described above as a system of components operating remotely from a user's computer 110. That is, the components of the system 130 may operate as a standalone system or computing device that may be called upon by a user's computer 110 for receiving predictive modeling services as described herein. Alternatively, the system 130 may be operated as a client-side system integrated with the user's computer 110 for providing predictive modeling services to software applications operating on the user's computer 110. In either case, the operation of the computers having access to the predictive modeling services of the system 130 is significantly improved and made more efficient because, owing to the predictive modeling services of the system 130, less computing resources (including memory) are used because many received electronic inputs may be automatically discarded (and not processed or stored) because, as the personalized predictive model is continually improved, as described herein, accurate predictions that many received electronic inputs may be ignored or discarded is enabled. In addition, when operating as a standalone device or system 130, the device or system 130 is improved and made more efficient over prior non-personalized predictive models because as the personalized predictive model becomes more accurate through continual updating, less processing resources are needed for disposing of future electronic inputs that are predicted as not requiring user action.

Figure 2:
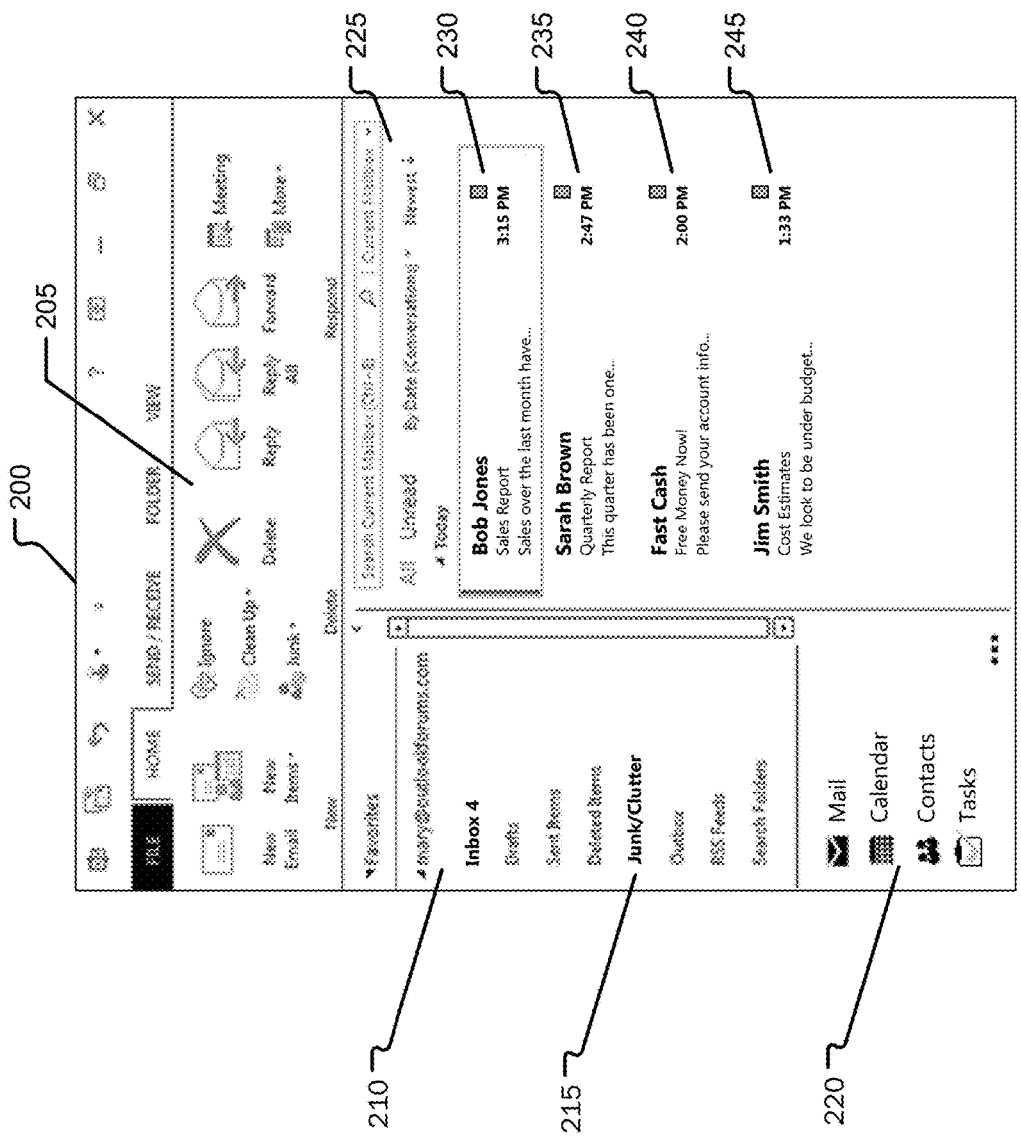
FIG. 2 illustrates a software application user interface containing electronic content for which user responses may be predicted according to a personalized predictive model.

FIG. 2 illustrates a software application user interface containing electronic content for which user responses may be predicted according to a personalized predictive model. As briefly described above, aspects of the present disclosure may be utilized for providing personalized predictive modeling for predicting user responses to received inputs across a variety of input types. An example electronic mail user interface 200 is illustrated in FIG. 2 for describing an example operation of a personalized predictive model generated as disclosed herein. In the user interface 200, an array of functionality controls 205 are provided for utilizing the functionality of an associated electronic mail software application. A pane 210 is provided in which selectable electronic mail repositories may be provided, for example, an inbox, a drafts folder, a deleted items folder, a sent mail folder, and a junk/clutter folder 215. A pane 220 includes one or more selectable controls for selectively obtaining one or more functionalities of the associated electronic mail application, including a mail function, a calendar function, a contacts function, a tasks function, and the like.

An electronic mail display pane 225 is illustrated in which a number of electronic mail items received by the user 105 are displayed. For example, a first electronic mail item 230 is from a sending user "Bob Jones" and has an associated subject of "sales report". A third electronic mail item 240 is from an example sending user of "Fast Cash" with an associated subject line of "Free money now". According to aspects of the present disclosure, after a personalized predictive model is generated, trained, and updated, as necessary, for a given user, then the predictive model may be used for not only predicting the particular user's response to a received input, but may be used for causing a given software application, for example, an electronic mail application, to automatically place an electronic mail item into a junk/clutter folder 215 because the personalized predictive model has been trained to accurately predict that the example electronic mail item will not be read by the user.

For example, referring to FIG. 2, if a personalized predictive model has been generated for the user 105 in association with the electronic mail application and user interface 200, and the model has predicted that emails from "Bob Jones," "Sarah Brown" and "Jim Smith" 230, 235, 245 respectively likely will be read by the user 105 based on the input associated with those electronic mail items, for example, the names of the sending parties, or content in the associated subject lines, or the dates associated with the electronic mail item transmissions, or any of a variety of other features that may be associated with the electronic mail items, then those items will be populated in the user interface 200, as illustrated in FIG. 2. On the other hand, if the personalized predictive model generated for the user 105 predicts that the example solicitation email 240 will not be read by the user based on features of the input associated with the example solicitation email, then in response to the prediction that the example solicitation email 240 will not be read by the user, the example email application may automatically cause that electronic mail item to be deposited in the junk/clutter folder 215 because it is predicted that the user will not read that electronic mail item.

As briefly described above, description of aspects of the present disclosure with respect to electronic mail items and electronic mail software applications is for purposes of illustration only and is not limiting of other uses of personalized prediction predictive models described herein. For example, a personalized predictive model may be generated for predicting a given traffic route that may be selected by a user via a navigation system based on historical responses to suggested traffic routes provided to the user. Similarly, prediction of an electronic coupon that may be selected and utilized by a user may be made by a personalized predictive model based on historical selection of specific electronic coupons when offered to the user as inputs. Similarly, a personalized predictive model may be generated for suggesting audio and video content items to a particular user by training the personalized predictive model based on actual selections of audio or video content items in response to offers of audio and video content items at an earlier time. That is, as should be appreciated from the foregoing examples, a personalized predictive model as described herein, may be generated, trained and updated from time-to-time for use in predicting a particular user's response to electronic inputs of any of a variety of types.

As briefly described above, according to one aspect of the present disclosure, in order to generate the personalized predictive model for each user, precision/recall curves are generated for each user with respect to each predicted response and associated actual response data for determining user response thresholds that may be used by the generated personalized predictive model for predicting user responses to future inputs. According to one aspect, the precision/recall curves are generated by taking into account classification data (e.g., whether an email message will be read or not) and truth data (e.g., whether a given email message was actually read or not) over a prescribed period of time (e.g., 7 days), and using standard formulas for precision and recall (set out below) at each potential threshold between 1 and 100. According to aspects of the present disclosure, variables used in the precision and recall formulas may take into account the time at which the input was received and at which the prediction was made where older data results in lower weighting. For example, every data point used for calculating a user's precision/recall curve may be assigned a weight which is based on the time of the data point. Older items have a lower weight while new items have higher weight.

Figure 3:
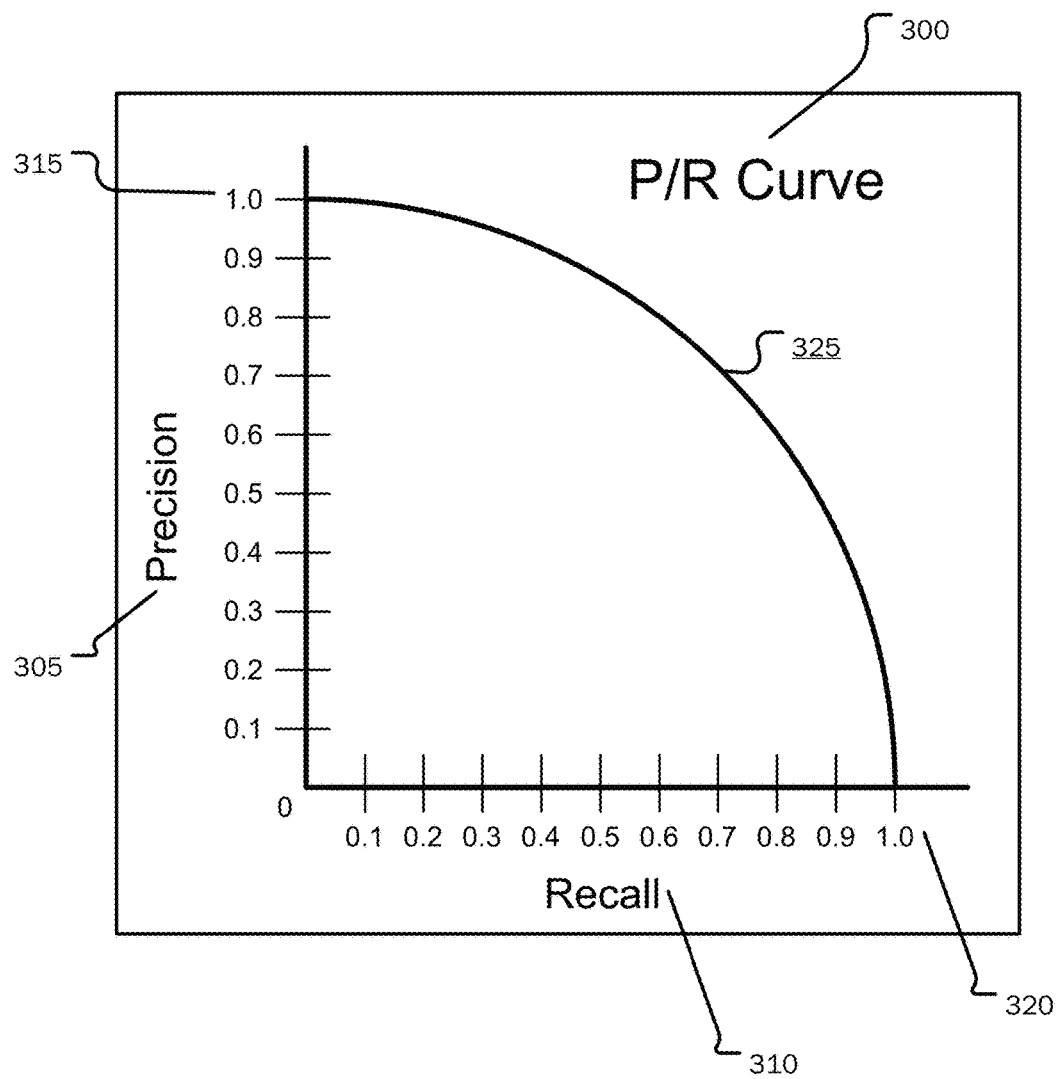
FIG. 3 illustrates an example precision/recall graph and curve.

An example precision/recall graph 300 is illustrated in FIG. 3 where precision 305 is plotted along a Y-axis 315 of the graph and where recall 310 is plotted along the X-axis 320 of the graph. As known by those skilled in the art, precision (sometimes referred to as positive predictive value) is a percentage or fraction of retrieved events or instances (e.g., received electronic mail messages of a given type) that are relevant (e.g., true responses or desired by the receiving user), and recall (sometimes also referred to as sensitivity) is a percentage or fraction of relative instances or events that are actually retrieved (e.g., a fraction or percentage of potentially true responses that are actually retrieved). For example, if a predictive model predicts 20 read emails, but only 10 are actually read by the user, and the model simultaneously fails to predict 10 additional email messages that are read by the user, then the predictive model's precision would be 10/20 or 50% and its recall would be 10/30 or 33%.

As known to those skilled in the art, for use in classification (e.g., classification of a received electronic mail message as one that will be read or one that will not be read), individual items may be classified as true positives, true negatives, false positives, and false negatives where the terms "positive" and "negative" refer to the predictive model's prediction (e.g., whether an electronic mail message will be read or not), and where the terms "true" and "false" refer to whether the prediction corresponds to the actual external observation or result (e.g., whether a received electronic mail message is actually read or not). According to one aspect, a standard formula for computing precision and recall may be defined as follows:

Precision=true positives/(true positives+false positives); and
Recall=true positives/(true positives+false negatives).

Precision may also be defined as the probability that a received input (e.g., received electronic mail message) will be selected by the particular user, and recall may be defined as the probability that the received input is actually selected by the particular user. Referring still to FIG. 3, the precision/recall curve 325 is a plot of precision versus recall and, as is understood by those skilled in the art, at high precision levels, low recall levels are obtained, and that at high recall levels, low precision levels are obtained.

According to aspects, such standard formulas and definitions of precision and recall may be utilized for computing precision/recall curves for each user, but the variables used in the formulas are computed based on the weight of the data points. According to one aspect, the count of true positives is not simply a count of data points with a true prediction and a true label (e.g., prediction that a given electronic mail message will be read that is actually read by the particular user), but instead, the count of true positives is the sum of weights of all data points where the prediction is true and the associated label is true (e.g., the sum of weights of all electronic mail messages predicted to be read that actually are read by the particular user). A similar computation may be performed for false positives, false negatives and true negatives. Thus, each of these variables assigns more weight to newer items (e.g., newer electronic mail messages) while still taking into account historical data. According to aspects, this results in smoother precision/recall curves for each user and improves the reliability of the predictions made by the personalized predictive model.

As will be described in further detail below with reference to FIGS. 4 and 5, once the precision and recall curves have been computed for each particular user, a subset of thresholds (points along the precision recall curve) that would result in a good prediction experience for the associated user based on the user's individual prediction/recall curve is identified. According to one aspect, a good prediction experience may be defined as a specific precision and recall target along the user's prediction/recall curve that optimizes prediction versus recall.

From the subset of thresholds, a particular threshold may be determined as an optimum threshold for use in the personalized predictive model for future predicted user decisions/responses. According to one aspect, the optimum threshold may be determined by taking a weighted sum of each of the thresholds identified in the subset of thresholds which can be used for prioritizing either precision or recall, as required for a given circumstance (e.g., electronic mail response predictions, search results predictions, traffic route suggestion predictions, and the like). Alternatively, the optimum threshold may be determined by taking a maximum score computed at each threshold, or according to another alternative, the optimum threshold may be determined as a weighted average of the thresholds. As should be appreciated, these are only examples of methods of determining an optimum threshold from a subset of thresholds and other methods may be employed including an iterative trial and error process where each of the subset of thresholds are utilized and examined for potential use as an optimum threshold.

Having described an example architecture and other aspects of the present disclosure above with reference to FIGS. 1-3, FIG. 4 is a flowchart showing general stages involved in an example method 400 for generating and utilizing a personalized predictive model. As mentioned above, aspects of the present disclosure may be utilized for predicting the user's action on a received electronic input according to a variety of different inputs. For purposes of description, the methods set out below are described in terms of a personalized predictive model's generation, update and utilization with respect to received electronic mail messages, but the description of these aspects with respect to received electronic mail messages should not be taken as limiting but for purposes of illustration and description only.

Figure 4:
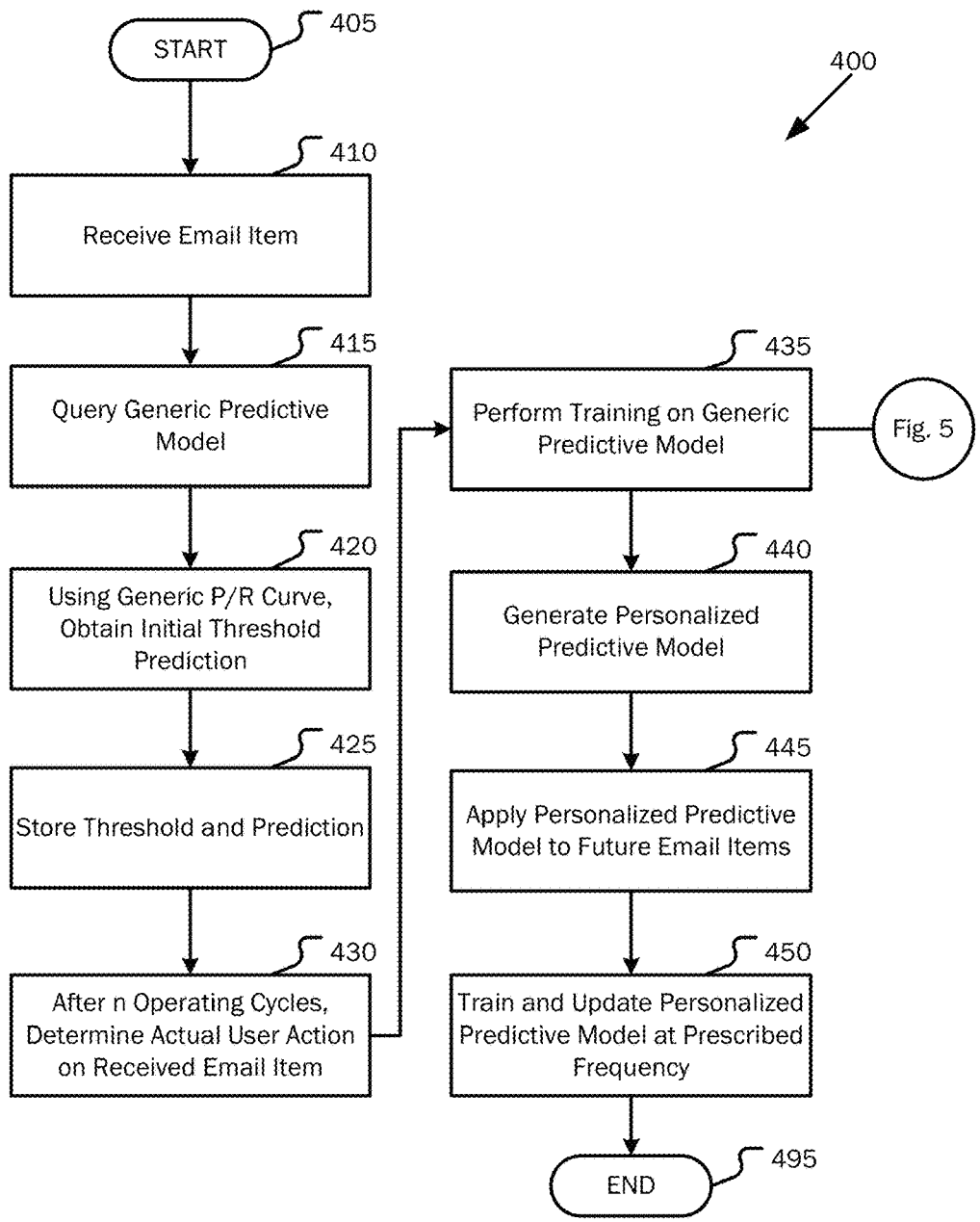
FIG. 4 is a flowchart showing general stages involved in an example method for generating and utilizing a personalized predictive model.

Referring then to FIG. 4, the operation 400 begins at start operation 405 and proceeds to operation 410 where a particular user receives a first electronic mail message. As should be appreciated, the received electronic mail message may include a variety of features, for example, an identified person or persons from whom the electronic mail message is received, an electronic mail message subject, a date/time of the received electronic mail message, one or more of a variety of content items, electronic mail message attachments, and the like. According to aspects, each of the features or attributes of the received electronic mail message may be utilized as variables for assisting in the generation, updating, and utilization of a personalized predictive model for the receiving user for predicting whether the receiving user will read or not read the received electronic mail message.

At operation 415, the generic modeling module 135 is queried for predicting whether the receiving user will read or not read the received electronic mail message. At operation 420, using a generic precision/recall curve, an initial threshold for the receiving user may be obtained for predicting whether the receiving user will read or not read the received electronic mail message. For example, as described above, a generic predictive model may predict that the receiving user will read any electronic mail message received from a person identified in the receiving user's contacts list, or that the receiving user may read an electronic mail message received at a date/time occurring during a prescribed range of dates/times, and the like. Thus, such a generic predictive model may be utilized across hundreds, thousands, or even millions of electronic mail users for predicting whether they may read or not read a given electronic mail message. As such, the accuracy of the predictions of the generic predictive model may not be acceptable to many receiving users. At operation 425, the threshold and prediction obtained from the generic predictive model are stored at the data repository 125.

At operation 430, after "n" operating cycles, for example, seven days, the usage monitoring module 160 parses the data repository 125 for obtaining information for a determination as to whether or not the predicted response for the received electronic mail message and for any other received electronic mail messages of the same type received during the example seven day period were actually read or not read. That is, the usage monitoring module 160 performs a determination on each received electronic mail message during the example operating period of seven days as to whether the messages were actually read or not read. The user's actual responses may be compared against the predicted responses for each of the analyzed received electronic mail messages for determining the accuracy of the predictions received for the electronic mail messages from the generic predictive model.

At operation 435, in response to an analysis of the actual user actions on the received electronic mail messages, the training module 145 may perform a training/updating of the utilized generic predictive model (as described in further detail with reference to FIG. 5) for generating a personalized predictive model for the receiving user 105. That is, if the actual responses by the receiving user as compared to the predicted responses for the receiving user are such that the ratio of actual responses to predicted responses results in an unacceptably low prediction accuracy, then the personalized modeling module 140, illustrated and described above with reference to FIG. 1, generates a personalized predictive model (operation 440) for the receiving user for improving the accuracy of predictions of the receiving user's responses to future electronic mail messages.

At operation 445, the generated personalized predictive model is applied to future electronic mail items received by the receiving user, and at operation 450, the generated personalized predictive model is trained and updated at a prescribed frequency in the same manner as described for operation 435. According to one aspect, the personalized predictive model may be analyzed, trained, and updated after every "n" cycles (e.g., every seven days) as described above with reference to operations 430 and 435. That is, according to this example, every day those electronic mail messages received over the last seven days will be analyzed for determining the accuracy of the user's actual actions on those received electronic mail messages as compared to the personalized predictive model's predictions for the user's actions on those electronic mail messages. Based on that accuracy determination, the personalized predictive model may be trained and updated for improving the accuracy with respect to future electronic mail messages, as described below with respect to FIG. 5. Thus, according to this aspect of the present disclosure, the personalized predictive model is not only generated for the particular user, but is regularly updated for improving the accuracy of its predictions.

As should be appreciated, a need for updating and improving the accuracy of the personalized predictive model is advantageous for a variety of reasons. For example, for a particular user, the user's actual actions on received electronic mail messages may vary over time. For example, while the user may not read electronic mail messages received from a particular source now, the user may begin to read electronic mail messages from that source at a later time as the user's circumstances (e.g., job responsibilities, interests, hobbies, and the like) change.

The method 400 ends at operation 495.

As described above with reference to FIG. 3 and with reference to operations 435 and 450 of FIG. 4, when a personalized predictive model is first generated or is updated from time-to-time, the personalized predictive model is passed to a trainer module 145 (illustrated above with reference to FIG. 1) where initial and/or updated precision/recall curves and user response thresholds are computed for updating the personalized predictive model so that predictions on future user actions will be more accurate. Referring now to FIG. 5, a flowchart showing general stages involved in an example method for training and updating a predictive model is described. According to aspects, the training and updating illustrated and described in FIG. 5 may be performed after "n" operating cycles described above with reference to operation 430, or these steps may be performed from time-to-time for causing a training and/or updating of a given personalized predictive model, as desired for ensuring accuracy of the associated model.

The method 500 begins at start operation 505 and proceeds to operation 510 where a number of electronic items for which user responses will be received are accumulated for analysis. For example, at operation 510, all email messages received over the last seven days may be retrieved for analysis, or a prescribed number of email messages, for example ten (10) email messages, may be retrieved for performing analysis and for training the personalized predictive model. At operation 515, an analysis is performed to determine how the predictions for each of the retrieved electronic mail messages compare against actual user decisions/responses on those retrieved electronic mail messages.

At operation 520, based on an analysis of how the actual decisions compared to the predictions for the received electronic mail messages, an updated precision/recall curve is computed for the receiving user for each threshold from 1 to 100, as described above with reference to FIG. 3. At operation 525, a subset of thresholds that provide a "good" or prescribed prediction outcome at a prescribed precision and recall target (on the precision/recall curve 325) is determined. At operation 530, an optimum threshold is determined from the subset of thresholds, as described above. At operation 535, the optimum threshold is returned for updating the personalized predictive model for use as described above with reference to FIG. 4.

For example, consider that the retrieved electronic mail messages include 100 messages, and consider that it is known that each of the messages are spam messages that should be moved to a junk/clutter folder and should not be read by the user. However, consider that 20 of those 100 messages have a probability of being read of 80% (0.80). Consider also that the remaining messages had a probability of being read of 50% (0.50). As should be appreciated, the example probabilities of 80% and 50% represent the user thresholds calculated for those electronic mail messages as described above with reference to FIG. 3. Consider, however, that according to the present version of the personalized predictive model that a threshold of 60% (0.60) has been set for the receiving user 105. Thus, the personalized predictive model, according to this example, will mispredict 20 messages because the probabilities for those messages are greater than the user threshold of 60%.

Figure 5:
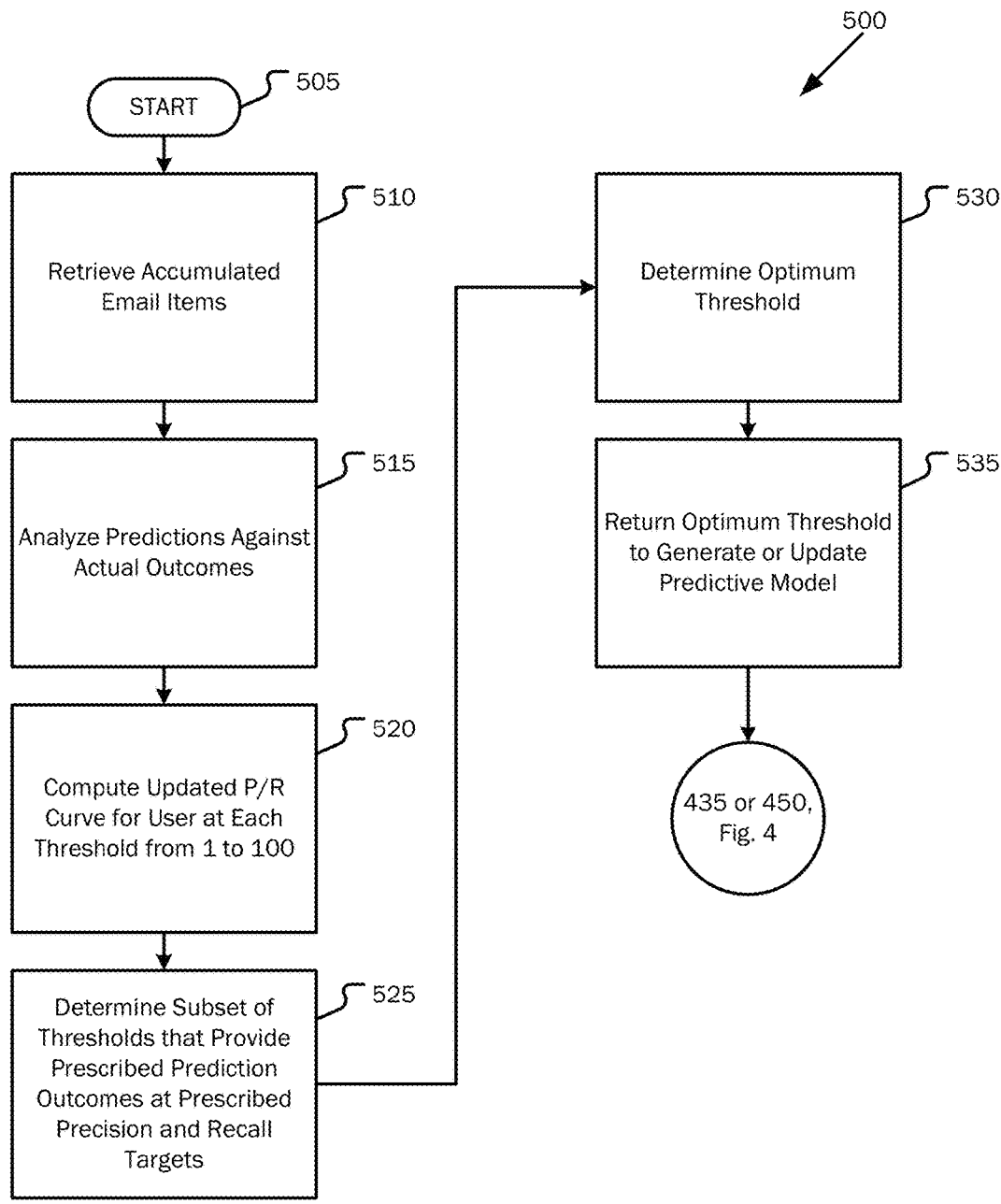
FIG. 5 is a flowchart showing general stages involved in an example method for training and updating a predictive model.

According to the method 500 illustrated in FIG. 5, because the truth is known for all 100 messages at the time of the analysis of the received messages (e.g., whether the messages should or should not be read), a computational loop is performed at operation 520 for computing a precision/recall curve for each potential threshold from 1 to 100 to determine thresholds that produce the best results. According to the present example, it is known that once a threshold of 80% is reached then 100% of the received messages will be marked as spam, junk or clutter. In response, the updated precision/recall curve is computed at each threshold level from 1 to 100 so that a determination may be made as to how many false positives and how many false negatives may be returned and so that a range of thresholds associated with false positives and false negatives may be determined.

According to one aspect, the subset or range of thresholds may be selected according to a number of different acceptable methods including an iterative examination of different thresholds that provide a good prediction experience. According to one aspect, the subset or range of thresholds may be determined as a function of the true positives and false positives which are component parts of the precision and recall functions and associated curves. For example, one threshold selection method may include optimizing a value function for an associated software application for utilizing the personalized predictive model (e.g., a feature for moving unwanted email messages to a junk/clutter folder). According to this example, the value function may be defined as: value=True Positive−X*False Positive, where X is a scale factor controlling how aggressive or cautious the user wants the system 130 to behave. According to this example, if clutter items/non-clutter items>X, then the value function may be positive even though the feature is putting all email messages into clutter/junk. Maximizing the value function will then potentially choose putting everything into clutter versus putting nothing into clutter (always value=0). To address this issue, a function may be used to scale X based on action share (e.g., desired percentage of email messages to be moved into a junk/clutter folder). According to this example, a simple function may include: f(Action Share)= $1/(1-\text{Action Share}^{10})$. The thresholds selected for the subset or range of thresholds may then be selected using the following example function: threshold=$\text{argmax}_{threshold}$* (TruePositive−X/(1−ActionShare$^{10}$)*FalsePositive).

According to this example, a threshold may be evaluated at 101 (i.e., one threshold above the 1-100 range) which will have a value of zero (0) and which will result in no items being placed into junk/clutter. Next, if the user receives 100% action share, then the function will be undefined. Thus, for a 100% action share, a threshold of 101 may be selected so that nothing will be placed into junk/clutter instead of placing everything into junk/clutter. According to one example, if a tie results from two thresholds, then the highest threshold may be selected.

As described above, after a subset or range of thresholds is determined, an optimum threshold may be determined from the best subset of determined thresholds. Thus, the set of thresholds and ultimately the optimum threshold may be computed for actually meeting those targets which according to the present example will be closer to the 80% level at which it is now known that 100% of the received email messages would be marked as spam, junk or clutter. As can be appreciated from this described example, each time the personalized predictive model is trained and updated, the goal is to establish an optimum decision threshold that will return the best percentage of true positive predictions.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which aspects are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
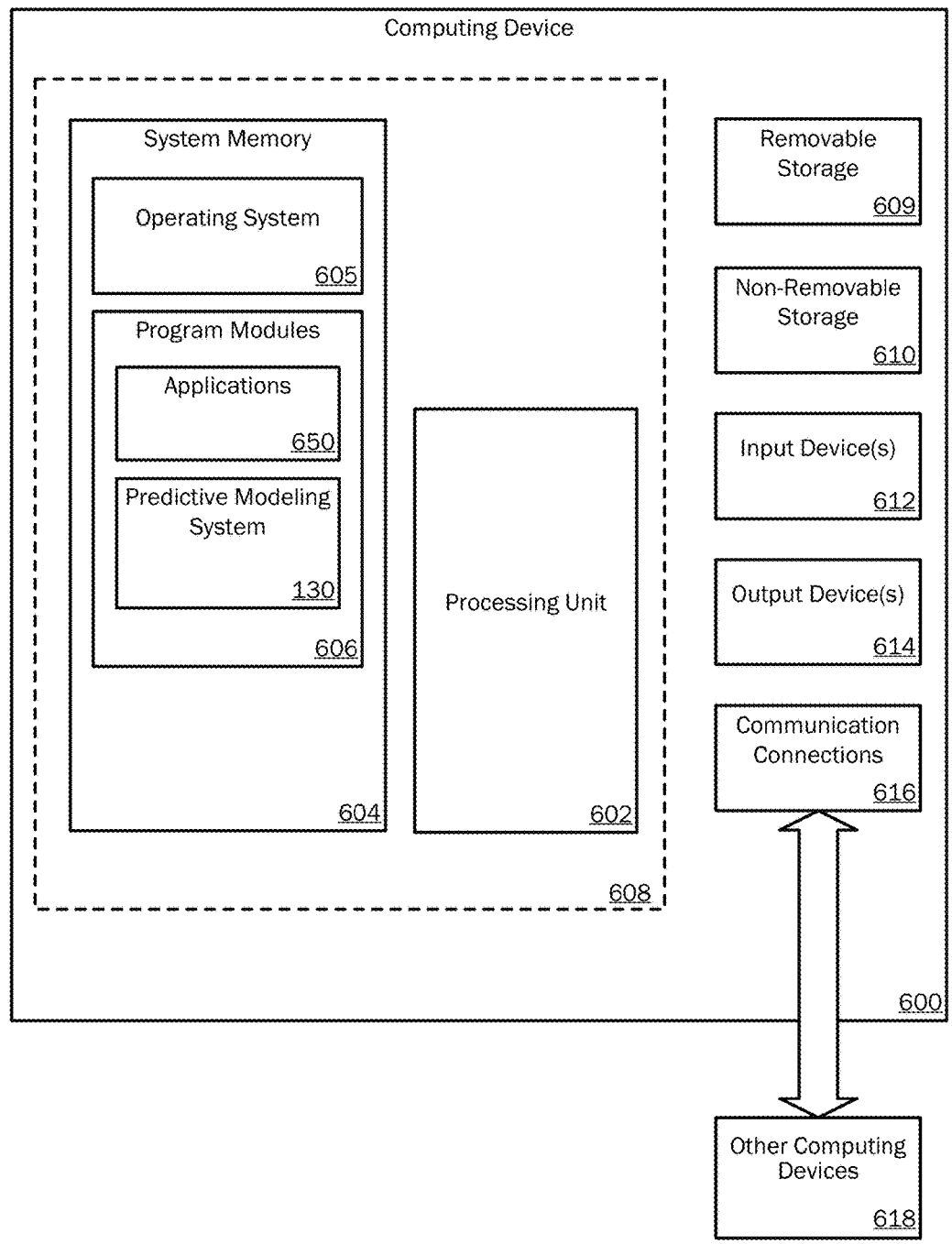
FIG. 6 is a block diagram illustrating one example of the physical components of a computing device.
Figure 7A:
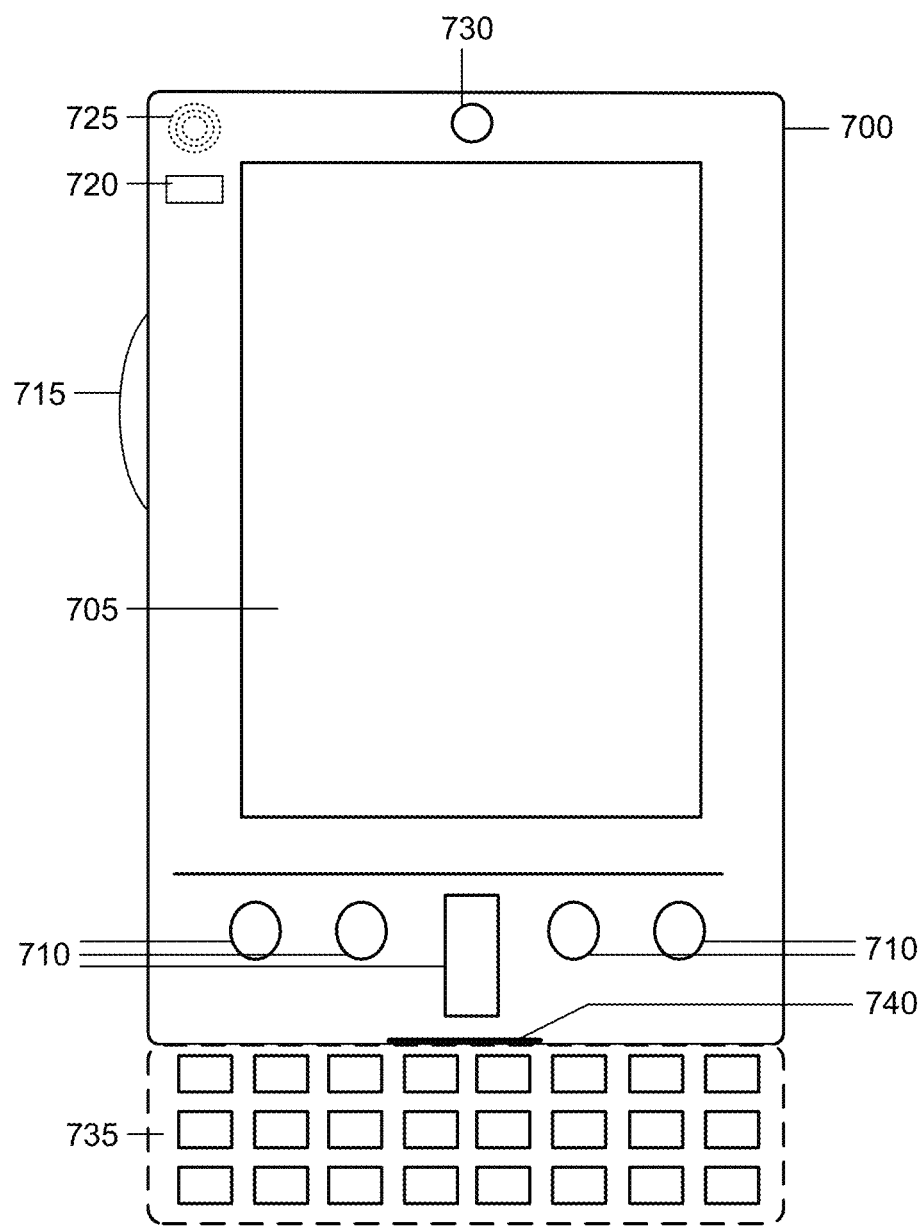
FIGS. 7A and 7B are simplified block diagrams of a mobile computing device.
Figure 7B:
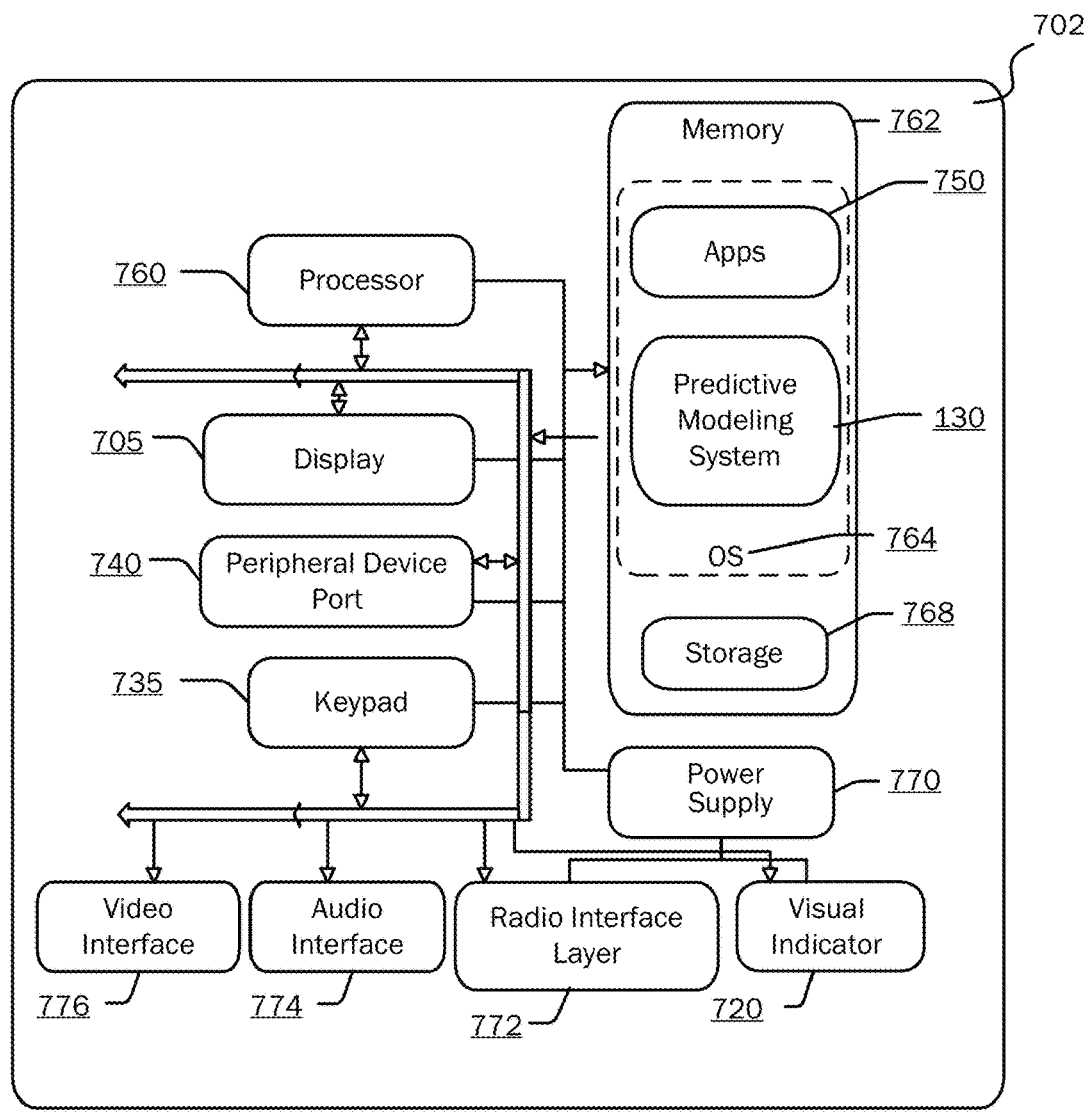
Figure 8:
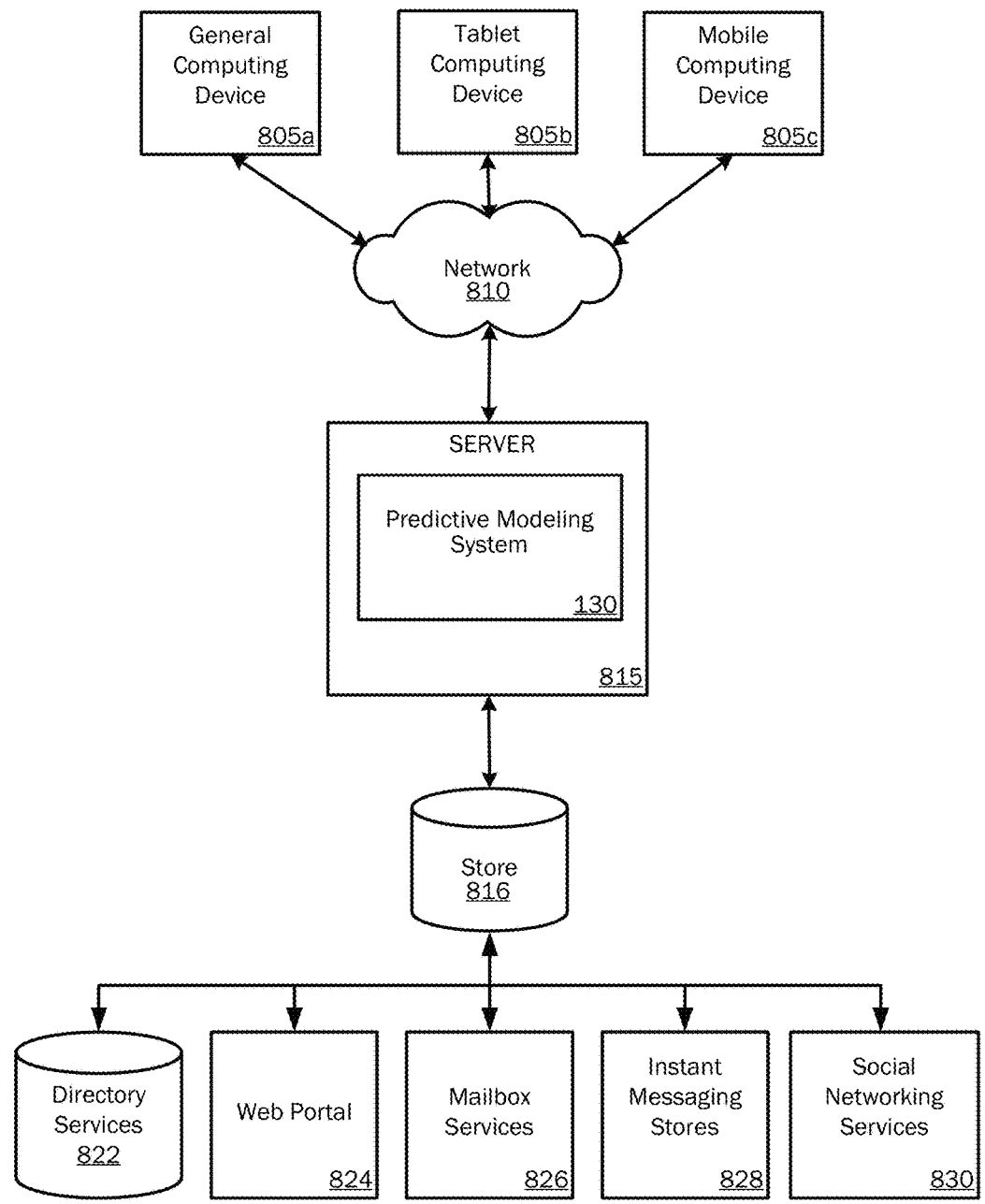
FIG. 8 is a simplified block diagram of a distributed computing system.

FIGS. 6-8 and the associated descriptions provide a discussion of a variety of operating environments in which examples of the present disclosure are practiced. However, the devices and systems illustrated and discussed with respect to FIGS. 6-8 are for purposes of example and illustration and are not limiting of a vast number of computing device configurations that are used for practicing aspects, described herein.

FIG. 6 is a block diagram illustrating physical components (i.e., hardware) of a computing device 600 with which examples of the present disclosure can be practiced. In a basic configuration, the computing device 600 includes at least one processing unit 602 and a system memory 604. According to an aspect, depending on the configuration and type of computing device, the system memory 604 comprises, but is not limited to, volatile storage (e.g., random access memory), non-volatile storage (e.g., read-only memory), flash memory, or any combination of such memories. According to an aspect, the system memory 604 includes an operating system 605 and one or more program modules 606 suitable for running software applications 650. According to an aspect, the system memory 604 includes the predictive modeling system 130. The operating system 605, for example, is suitable for controlling the operation of the computing device 600. Furthermore, aspects are practiced in conjunction with a graphics library, other operating systems, or any other application program, and are not limited to any particular application or system. This basic configuration is illustrated in FIG. 6 by those components within a dashed line 608. According to an aspect, the computing device 600 has additional features or functionality. For example, according to an aspect, the computing device 600 includes additional data storage devices (removable and/or non-removable) such as, for example, magnetic disks, optical disks, or tape. Such additional storage is illustrated in FIG. 6 by a removable storage device 609 and a non-removable storage device 610.

As stated above, according to an aspect, a number of program modules and data files are stored in the system memory 604. While executing on the processing unit 602, the program modules 606 (e.g., predictive modeling system 130) performs processes including, but not limited to, one or more of the stages of the methods 400, 500 illustrated in FIGS. 4 and 5. According to an aspect, other program modules are used in accordance with examples of the present disclosure and include applications such as electronic mail and contacts applications, word processing applications, spreadsheet applications, database applications, slide presentation applications, drawing or computer-aided application programs, etc.

Aspects of the present disclosure are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 6 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 600 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 600 has one or more input device(s) 612 such as a keyboard, a mouse, a pen, a sound input device, a touch input device, etc. The output device(s) 614 such as a display, speakers, a printer, etc. are also included according to an aspect. The aforementioned devices are examples and others may be used. According to an aspect, the computing device 600 includes one or more communication connections 616 allowing communications with other computing devices 618. Examples of suitable communication connections 616 include, but are not limited to, RF transmitter, receiver, and/or transceiver circuitry; universal serial bus (USB), parallel, and/or serial ports.

The term computer readable media as used herein includes computer storage media. Computer storage media include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. According to an aspect, any such computer storage media is part of the computing device 600. Computer storage media do not include a carrier wave or other propagated data signal.

According to an aspect, communication media is embodied by computer readable instructions, data structures, program modules, or other data in a modulated data signal, such as a carrier wave or other transport mechanism, and includes any information delivery media or transmission media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, a tablet personal computer, a laptop computer, and the like, with which aspects may be practiced. With reference to FIG. 7A, an example of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. According to an aspect, the display 705 of the mobile computing device 700 functions as an input device (e.g., a touch screen display). If included, an optional side input element 715 allows further user input. According to an aspect, the side input element 715 is a rotary switch, a button, or any other type of manual input element. In alternative examples, mobile computing device 700 incorporates more or less input elements. For example, the display 705 may not be a touch screen in some examples. In alternative examples, the mobile computing device 700 is a portable phone system, such as a cellular phone. According to an aspect, the mobile computing device 700 includes an optional keypad 735. According to an aspect, the optional keypad 735 is a physical keypad. According to another aspect, the optional keypad 735 is a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some examples, the mobile computing device 700 incorporates a vibration transducer for providing the user with tactile feedback. In yet another example, the mobile computing device 700 incorporates peripheral device port 740, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one example of a mobile computing device. That is, the mobile computing device 700 incorporates a system (i.e., an architecture) 702 to implement some examples. In one example, the system 702 is implemented as a "smart phone" capable of running one or more applications (e.g., browser, e-mail, calendaring, contact managers, messaging clients, games, and media clients/players). In some examples, the system 702 is integrated as a computing device, such as an integrated personal digital assistant (PDA) and wireless phone.

According to an aspect, one or more application programs 750 are loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. According to an aspect, the predictive modeling system 130 is loaded into memory 762. The system 702 also includes a non-volatile storage area 768 within the memory 762. The non-volatile storage area 768 is used to store persistent information that should not be lost if the system 702 is powered down. The application programs 750 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700.

According to an aspect, the system 702 has a power supply 770, which is implemented as one or more batteries. According to an aspect, the power supply 770 further includes an external power source, such as an AC adapter or a powered docking cradle that supplements or recharges the batteries.

According to an aspect, the system 702 includes a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 750 via the operating system 764, and vice versa.

According to an aspect, the visual indicator 720 is used to provide visual notifications and/or an audio interface 774 is used for producing audible notifications via the audio transducer 725. In the illustrated example, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. According to an aspect, the system 702 further includes a video interface 776 that enables an operation of an on-board camera 730 to record still images, video stream, and the like.

According to an aspect, a mobile computing device 700 implementing the system 702 has additional features or functionality. For example, the mobile computing device 700 includes additional data storage devices (removable and/or non-removable) such as, magnetic disks, optical disks, or tape. Such additional storage is illustrated in FIG. 7B by the non-volatile storage area 768.

According to an aspect, data/information generated or captured by the mobile computing device 700 and stored via the system 702 is stored locally on the mobile computing device 700, as described above. According to another aspect, the data is stored on any number of storage media that is accessible by the device via the radio 772 or via a wired connection between the mobile computing device 700 and a separate computing device associated with the mobile computing device 700, for example, a server computer in a distributed computing network, such as the Internet. As should be appreciated such data/information is accessible via the mobile computing device 700 via the radio 772 or via a distributed computing network. Similarly, according to an aspect, such data/information is readily transferred between computing devices for storage and use according to well-known data/information transfer and storage means, including electronic mail and collaborative data/information sharing systems.

FIG. 8 illustrates one example of the architecture of a system for providing a real-time presentation of customizable drill-down views of data at specific data points as described above. Content developed, interacted with, or edited in association with the predictive modeling system 130 is enabled to be stored in different communication channels or other storage types. For example, various documents may be stored using a directory service 822, a web portal 824, a mailbox service 826, an instant messaging store 828, or a social networking site 830. The predictive modeling system 130 is operable to use any of these types of systems or the like for providing real-time presentation of customizable drill-down views of data at specific data points, as described herein. According to an aspect, a server 815 provides the predictive modeling system 130 to clients 805a-c. As one example, the server 815 is a web server providing the predictive modeling system 130 over the web. The server 815 provides the predictive modeling system 130 over the web to clients 805 through a network 810. By way of example, the client computing device is implemented and embodied in a personal computer 805a, a tablet computing device 805b or a mobile computing device 805c (e.g., a smart phone), or other computing device. Any of these examples of the client computing device are operable to obtain content from the store 816.

Aspects of the present disclosure, for example, are described above with reference to block diagrams and/or operational illustrations of methods, systems, and computer program products. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope of the present disclosure as claimed in any way. The aspects, examples, and details provided in this application are considered sufficient to convey possession and enable others to make and use the best mode claimed. The present disclosure should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the present disclosure.

We claim:

1. A system for generating a personalized predictive model; comprising:
    a user interface;
    a processor in communication with the user interface; and
    a memory including instructions, which when executed by the processor, cause the system to operate:
        an email application operative to:
            receive an email, wherein the email comprises two or more features characterizing the email;
            present the email to the user interface for a user to make a user decision;
        a generic predictive modeling module operative to:
            generate a generic predictive model for predicting the user decision on the received email;
            utilize a generic precision/recall curve for obtaining a user decision threshold for determining a percentage of received emails to be decided according to a prescribed decision by the user, wherein the generic precision/recall curve is generated from at least another user's response to a same or similar email, and wherein which generic precision/recall curve is utilized may be based, at least in part, on the two or more features;
        a usage monitoring module operative to compare an actual user decision on the received email with the predicted user decision for determining an accuracy of the predicted user decision;
        a personalized predictive model training module operative to update one or more features of the generic predictive model for personalizing the generic predictive model as a personalized predictive model for a user of the received email;
        a personalized predictive modeling module operative to:
            generate the personalized predictive model based on the one or more updated features for predicting a decision of the user on one or more future emails:
            update the personalized predictive model periodically based on user inputs during to improve accuracy; and
        wherein the email application applies the personalized predictive model to move automatically an email message to a junk folder without input from the user.

2. The system of claim 1, the usage monitoring module being further operative to compare a plurality of actual user decisions with a plurality of corresponding predicted user decisions, the actual user decisions and the corresponding predicted user decisions accumulated over a prescribed period of time.

3. The system of claim 1, the personalized predictive model training module being further operative to compute an updated precision/recall curve that is personalized to the receiving user based on the plurality of actual user decisions and corresponding predicted user decisions accumulated over the prescribed period of time.

4. The system of claim 3, the personalized predictive model training module being further operative to determine a plurality of user decision thresholds that will improve accuracy of future predicted user decisions on future emails.

5. The system of claim 4, the personalized predictive model training module being further operative to compute an optimum user decision threshold for use in the personalized predictive model for the future predicted user decisions.

6. The system of claim 5, the personalized predictive module being further operative to generate an updated personalized predictive model based on the optimum user decision threshold for use in predicting future user decisions on future emails.

7. The system of claim 6, the personalized prediction modeling module being further operative to update the updated personalized predictive model based on an updated optimum user decision threshold generated in response to an analysis of predicted future user decisions compared with actual user decisions on the future emails.

8. The system of claim 1, wherein the system for generating a personalized predictive model is operative to communicate the personalized predictive model to the email application for causing the email application to act on one or more future emails received by a user of the email application.

9. The system of claim 8, wherein one or more decisions by the user of the email application on the one or more future emails are monitored by the usage monitoring module for determining an accuracy of predictions made by the personalized predictive model for responses to the one or more future emails by the user of the email application.

10. The system of claim 9, wherein the personalized predictive modeling module is further operative to update the generated personalized predictive model based on the one or more decisions by the user of the email application on the one or more future emails.

11. A method for improving the functionality of a computing device on which is operated a email application with functionality requiring user action on received emails, comprising:
    receiving, by the email application executing on the computing device, an email, wherein the email comprises two or more features characterizing the email;
    presenting, on a user interface of the computing device, the email to a user for a user decision;
    predicting the user decision on the received email via a generic predictive model operated by the computing device, wherein the generic predictive model utilizes a generic precision/recall curve for obtaining a user decision threshold for determining a percentage of received emails to be decided according to a prescribed decision by the user, wherein the generic precision/recall curve is generated from at least another user's response to a same or similar email, and wherein which generic precision/recall curve is utilized may be based, at least in part, on the two or more features;
    comparing an actual user decision on the received email with the predicted user decision for determining an accuracy of the predicted user decision;

updating one or more features of the generic predictive model for personalizing the generic predictive model as a personalized predictive model for a user of the received email;

performing a computational loop for a precision recall curve associated each of two or more potential thresholds to determine best threshold value for the personalized predictive model;

generating the personalized predictive model based on the one or more updated features for predicting a decision of the user on one or more future emails; and applying the personalized predictive model to move automatically an email message to a junk folder without input from the user.

12. The method of claim 11, further comprising comparing a plurality of actual user decisions with a plurality of corresponding predicted user decisions, the actual user decisions and the corresponding predicted user decisions accumulated over a prescribed period of time.

13. The method of claim 11, further comprising computing an updated precision/recall curve that is personalized to the receiving user based on the plurality of actual user decisions and corresponding predicted user decisions accumulated over the prescribed period of time.

14. The method of claim 13, further comprising determining a plurality of user decision thresholds that will improve accuracy of future predicted user decision on future emails.

15. The method of claim 14, further comprising computing an optimum user decision threshold for use in the personalized predictive model for the future predicted user decisions.

16. The method of claim 15, further comprising generating an updated personalized predictive model based on the optimum user decision threshold for use in predicting future user decisions on future emails.

17. A method for predicting a user's decisions on received emails; comprising:

receiving via a email application an email requiring a decision by a receiving user, wherein the email comprises two or more features characterizing the email;

presenting, on a user interface of the computing device, the email to a user for the user decision;

using a generic predictive model, predicting the user decision on a received email, wherein the generic predictive model utilizes a generic precision/recall curve for obtaining a user decision threshold for determining a percentage of received emails to be decided according to a prescribed decision by the user, wherein the generic precision/recall curve is generated from at least another user's response to a same or similar email, and wherein which generic precision/recall curve is utilized may be based, at least in part, on the two or more features;

performing a computational loop for a precision recall curve associated with each of two or more potential thresholds to determine best threshold value for the personalized predictive model;

comparing an actual user decision on the received email with the predicted user decision for determining an accuracy of the predicted user decision;

generating a personalized predictive model by updating one or more features of the generic predictive model for personalizing the generic predictive model as a personalized predictive model for a user of the received email;

using the personalized predictive model for predicting a user decision for each of a plurality of future emails;

based on the prediction, moving automatically an email message to a junk folder without input from the user after a prescribed duration of time, comparing an actual user decision for each of the plurality of future emails with corresponding predicted user decisions for each of the plurality of future emails; and updating the personalized predictive model for more accurately predicting a user decision for each of a plurality of additional future emails.

18. The method of claim 17, wherein updating the personalized predictive model includes:

computing an updated precision/recall curve that is personalized to the receiving user based on the plurality of actual user decisions and corresponding predicted user decisions accumulated over the prescribed duration of time;

determining a plurality of user decision thresholds that will improve accuracy of future predicted user decision on future emails;

computing an optimum user decision threshold for use in the personalized predictive model for the future predicted user decisions; and utilizing the optimum user decision threshold for predicting future user decisions on the plurality of additional future emails.

* * * * *